United States Patent Office 2,993,711
Patented July 25, 1961

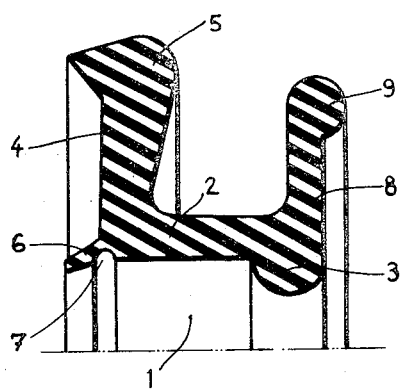
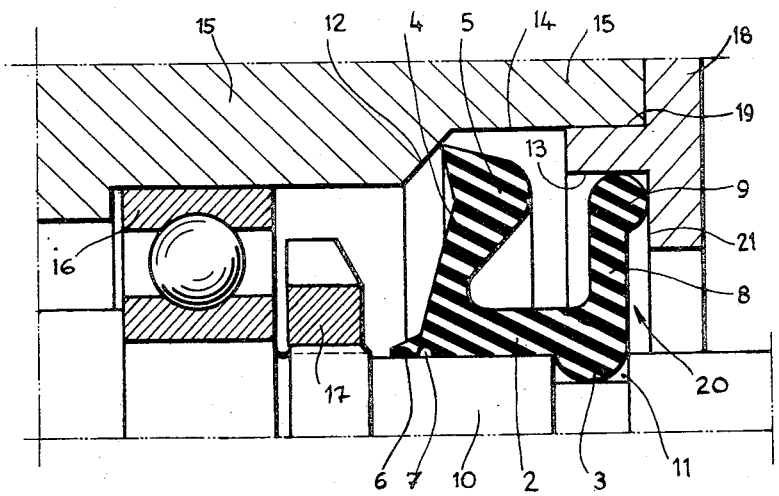

2,993,711
FLUID-TIGHT PACKINGS OF FLEXIBLE MATERIAL
Lucien Péras, Billancourt, France, assignor to Regie Nationale des Usines Renault, Billancourt, France
Original application Sept. 21, 1956, Ser. No. 611,305. Divided and this application Oct. 18, 1960, Ser. No. 63,352
Claims priority, application France Jan. 7, 1956
3 Claims. (Cl. 286—11.16)

This is a division of application Serial No. 611,305 filed on September 21, 1956, now abandoned.

In order to provide fluid-tightness at joints between rotating members where they extend through a casing, use is currently made of static packings fixed to the casing and formed with a circular lip which is applied against a rotating member. The pressure of the fluid contained inside the casing presses the lip against the shaft or cylinder which is rotating, thus providing a fluid-tightness which is greater in proportion as the pressure of the fluid is higher.

Now this type of packing is unsuitable when the pressure of the fluid is very low or nil. This is the case at points where shafts of gearboxes, speed-reducing gear, variable-speed gear or the like are brought out of the casing in which the gear is housed. The lip is pressed against the shaft only by the elastic tension of the packing; moreover, the smooth surface of the lip cannot ensure close contact at all points, so that the result may be more or less considerable leakage, which is disadvantageous and often dangerous.

The present invention obviates these disadvantages by providing a packing which provides perfect fluid-tightness. The packing comprises on the one hand a heel of toric form or bead which penetrates into an appropriate groove formed in one of the parts moving with respect to one another, in which groove it is held in radial tension and, on the other hand, a frictional contact lip.

Preferably, the packing is mounted on the rotating member in such manner as to be rotated thereby. The lip is then applied against the wall of the casing by a force which is imparted to the lip initially, and also by the centrifugal force resulting from the speed of the rotating member. The fluid-tightness obtained is further augmented by the fact that the torus of the lip ensures infinitely better contact than that of ordinary lips, the frictional contact surface in contact with the fixed wall being reduced to a minimum.

The invention also proposes a simple and economical construction of the packing for ensuring perfect fluid-tightness with low pressure fluids without its being necessary to include a spring in the packing.

In this case, the packing is also held in radial tension on the rotating member with which it is entrained. The movable lip is applied to abut against the other member, with which it cooperates, by means of its own appropriately adjusted resilience, the curvature of the lip being determined so as to obtain fluid-tightness in dependence on the pressure of the fluid, and also, during running, by means of the centrifugal force produced.

The features and advantages of the packing according to the invention will be brought out clearly from the description which will now be given with reference to the accompanying drawings, wherein by way of example:

FIGURE 1 is a sectional view of a packing according to the invention;

FIGURE 2 is a sectional view of a packing structure according to the invention;

Figure 3:
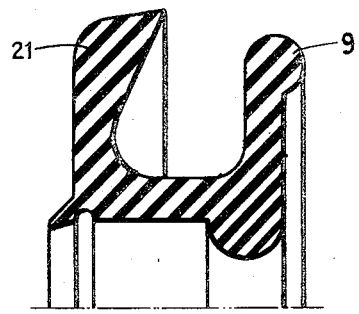
FIGURE 3 is a sectional view of a packing which is slightly different from that of FIGURE 1.

Referring now to the drawing, in which like reference numerals denote like parts, and more particularly to FIGURE 1, it will be seen that the yieldable packing elements 1 comprises a sleeve-like portion 2, internally thereof at least one annular beaded section 3 and a first annular deformable flange portion 4 integral with said sleeve portion and projecting radially outwardly of the sleeve-like portion with an enlarged annular free end section 5. Said sleeve-like portion has substantially at its end bearing said first flange an integral annular deformable lip 6 having a reduced annular cross-section 7 at an area of juncture with the first flange portion 4. Disposed at an opposite end of the sleeve like portion 2 bearing the first flange portion 4, a second annular flange portion 8 extends radially outwardly of the sleeve-like portion and has a beaded marginal portion 9.

The embodiment shown in FIGURE 2 illustrates a complete packing structure with a yieldable packing similar to that of FIGURE 1 and provided with an annular lip 6 which prevents oil leakages along the rotating shaft.

The packing illustrated in FIGURES 1 to 5 comprises a lip or flange having a beaded marginal portion 9 providing protection against the penetration of dust inside the packing.

The body 2 of the packing, is held in radial tension on the shaft 10 on which it is locked in axial position by the bead 3 which penetrates into the circular groove 11.

A bevelled lip 5 provides fluid-tightness by bearing against a contact surface 12 with the elastic force which is determined at the time of assembly. A supplementary lip 8 carries a toric bead 9 which comes into contact, without excessive tension, with the two surfaces 13 which are disposed at an angle relative to one another.

The object of this lip and the toric bead is to prevent the entry of dust or particles of sand into the packing, fulfilling the same function as protective felts the use of which is known especially in foundry applications.

The advantage of this lip incorporated in the packing is to form an assembly which is easy to mount, and also that it does not entail much bulk.

The short annular lip 6 renders oiltight the passage between the packing and the shaft.

FIGURE 1 shows the packing itself. FIGURE 2 shows it in position in a sealing arrangement comprising a body 15 of a casing in which a shaft 10 is rotatable by means of a ball bearing 16 which is locked on the shaft by a nut 17.

The housing in which the packing is contained is closed by a joint cover 18, which is centered in the casing by the bearing surface 19 and is fixed by bolts (not shown).

The chamber formed between the lips 5, 9 and the wall 14 of the casing is filled with grease at the time of assembly. Foreign particles, for example dust, which might penetrate into the packing in the direction of the arrow 20 will be prevented from doing so by the lip 9. Those which may penetrate, nevertheless, will be absorbed by the grease and cannot damage the sealing lip 5.

Figure 4:
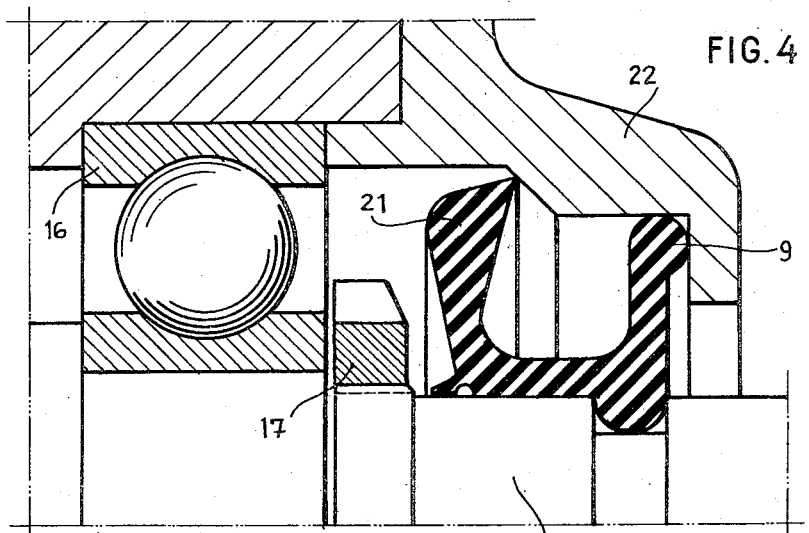
FIGURE 4 is a sectional view of a packing structure comprising the packing of FIGURE 3.

The packing illustrated in FIGURES 3 and 4 shows a modified form of embodiment. FIGURE 3 shows the packing itself, FIGURE 4 shows the packing in position in a sealing arrangement, which is similar to that described previously; but in this case the bevelled lip 21 faces the supplementary lip 9.

This arrangement is due to the fact that the packing can be mounted according to FIGURE 4, in which the contact surface presented to the packing lip belongs not to the casing but to the joint cover 22 which is centered in the casing, to which it is fixed by bolts (not shown).

Also represented in this figure are a shaft 13 and a ball bearing 16 held in position by a nut 17. As previously, grease is introduced into the chamber formed between the two lips 21 and 9.

Figure 5:
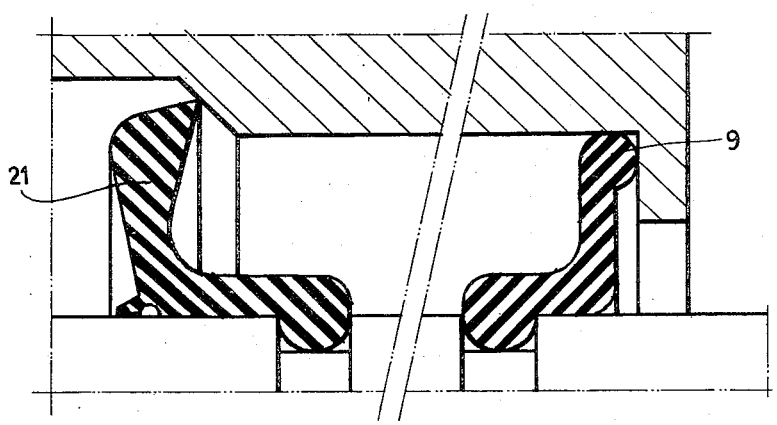
FIGURE 5 is a sectional view of a packing structure which is slightly different from that of FIGURE 4.

FIGURE 5 illustrates an assembly consisting of two packings which behave similarly to the packing of FIGURE 4, except that, the interval between the two lips 21 and 9 is considerable, it is preferable to juxtaposition two packing elements, the packing 23 providing fluid-tightness and the packing 24 protecting the arrangement against dust.

In this case the sleeve-like portion consists of two coaxial annular parts one of which carries the flange portion 21, the lip 6 and the rim 3, the other carries the lip 9 and internally of the sleeve like portion another annular beaded rim section 25.

Depending on the conditions of use and the dimensions of the sealing arrangement, it is possible to connect the bodies of the two packing elements together by a sleeve.

The packings according to the invention can be constructed of any material such as rubber of any hardness natural or synthetic polymer or resin.

I claim:

1. In a packing structure for containing a fluid under pressure, the combination comprising a first member and a second elongated member rotative in said first member, said first and second members cooperating and having radially spaced faces, the face of said first member substantially corresponding to the internal surface of a frusto-conical configuration, the rotative member having at least one annular groove open to its face, a yieldable packing element forming a fluid-tight seal disposed between said members and comprising a sleeve-like portion mounted peripherally on the rotative member and having internally thereof at least one annular beaded section releasably mounted and held under axially directed compression pressure and in radial tension in said annular groove to prevent axial travel of said packing element on said rotative member, and to effect a fluid-tight seal, a first annular deformable outwardly directed flange portion offset from the normal of the axis of said rotative member and situated at substantially one end of said sleeve-like portion, said first flange portion being integral with said sleeve-like portion and projecting radially outwardly of the sleeve-like portion with an enlarged annular free end section constantly frictionally engaging and bearing against the face of said first member along one line of contact and said free end section being disposed to move against the face of said first member in response to centrifugal force when the rotative member is rotated thereby to effect a fluid-tight seal between it and said face of the first member, said sleeve-like portion having substantially at its end bearing said first flange an integral annular deformable lip for effecting a fluid-tight axial seal on said rotative member, said lip having a reduced annular cross-section at an area of juncture with the first flange portion, a second annular flange portion extending radially outwardly of the sleeve-like portion and disposed at an opposite end of the sleeve-like portion from the first flange portion, said second flange portion having a beaded marginal edge portion for frictionally engaging along a line of contact another face of said first member.

2. In a packing structure as claimed in claim 1, wherein said beaded section of the sleeve-like portion disposed on said groove and said second flange portion are disposed at a common end of said sleeve-like portion substantially in a common radial plane relative to the rotative member.

3. In a packing structure as claimed in claim 1, wherein said sleeve-like portion consists of two separate coaxial annular parts of which one carries said first flange portion said integral annular deformable lip and has internally thereof said annular beaded section, and the other carries said second flange portion and has internally thereof a second annular beaded section.

References Cited in the file of this patent

UNITED STATES PATENTS

| 2,830,858 | Moorman | Apr. 15, 1958 |
| 2,878,084 | Bermingham | Mar. 17, 1959 |